United States Patent [19]

Tanimoto et al.

[11] Patent Number: 5,111,242
[45] Date of Patent: May 5, 1992

[54] IMAGE FORMING APPARATUS HAVING A MORE SMOOTHLY CONTROLLED IMAGE FORMING ELEMENT

[75] Inventors: Koji Tanimoto; Kazuhisa Kimura; Kazuo Sasama, all of Kanagawa, Japan

[73] Assignee: Kabushiki Kaisha Toshiba, Kanagawa, Japan

[21] Appl. No.: 572,408

[22] Filed: Aug. 27, 1990

[30] Foreign Application Priority Data

Sep. 29, 1989 [JP] Japan .................. 1-253964

[51] Int. Cl.⁵ .......................................... G03G 15/00
[52] U.S. Cl. ...................... 355/200; 355/211; 355/271; 346/160; 318/685; 318/696
[58] Field of Search ............ 355/200, 204, 211, 271; 318/685, 696; 346/160, 160.1; 358/300, 296

[56] References Cited

U.S. PATENT DOCUMENTS

| | | | |
|---|---|---|---|
| 4,145,644 | 3/1979 | Liu | 318/696 |
| 4,578,689 | 3/1986 | Spencer et al. | 346/160 |
| 4,710,691 | 12/1987 | Bergstrom et al. | 318/696 |
| 4,723,145 | 2/1988 | Takada et al. | 346/160 X |

FOREIGN PATENT DOCUMENTS

6375759 9/1986 Japan.
1-179056 7/1989 Japan .................. 355/204

Primary Examiner—Joan H. Pendegrass
Attorney, Agent, or Firm—Finnegan, Henderson, Farabow, Garrett, and Dunner

[57] ABSTRACT

An image forming apparatus for producing a visible image on an image forming medium includes a photosensitive drum for carrying a latent image thereon, a developer for developing the latent image to form a developed image on the photosensitive drum, and a transferring drum for supporting the image forming medium and transferring the developed image onto the image forming medium. The image forming apparatus further includes a stepping motor, which has a plurality of exciting windings, for rotating the photosenstive drum, a driver for driving the stepping motor, and a controller for controlling the driver such that the plurality of exciting windings are switched to be excited in a prescribed manner, the controller periodically varying the switching time intervals for exciting the windings in correspondence to variations in the rotational speed of the stepping motor.

21 Claims, 10 Drawing Sheets

| ADDRESS | DATA | Δt(μs) | REMARKS |
|---|---|---|---|
| 0 | 9000 | 600 | Δt min |
| 1 | 9400 | 627 | |
| 2 | 9800 | 653 | |
| 3 | 10200 | 680 | |
| 4 | 10600 | 707 | |
| 5 | 11000 | 733 | Δt max |
| 6 | 10600 | 707 | |
| 7 | 10200 | 680 | |
| 8 | 9800 | 653 | |
| 9 | 9400 | 627 | |

IMAGE FORMING APPARATUS HAVING A MORE SMOOTHLY CONTROLLED IMAGE FORMING ELEMENT

1. FIELD OF THE INVENTION

The present invention relates to an image forming apparatus such as, for instance, laser beam printers, which form images on image forming media.

2. DESCRIPTION OF THE RELATED ART

In an image forming apparatus such as, for instance, a laser beam printer, a stepping motor has been used to rotate a photosensitive drum. The reason a stepping motor is used is that the stepping motor can be controlled by digital signals from a CPU. Thus, with the stepping motor it is possible to adjust the rotation speed and to determine positions with high accuracy. Further, the direction of rotation of the stepping motor can be freely changed.

However, because the stepping motor obtains its rotating force by continuous step operation, speed variation or uneven rotation occurs. In extreme cases this gives rise to string vibration. These speed variations (uneven rotation) or vibration which arise from the stepping motor make their appearance as image blurring and image unevenness in the output images of the laser beam printer.

Therefore, in order to reduce the speed variations (uneven rotation) or vibration, the prior art adopted such methods as fitting a dynamic damper to the rotor spindle or the load spindle of the stepping motor. Alternatively, the speed variation is controlled by inserting damping material in the torque transmission mechanism, or smoothing the rotation by using a large flywheel. Also, as an electrical device, it was attempted to divide 1 step into from several steps to several tens of steps by staged increase or decrease of the impressed current to different excitation phases and by staged shifting of the rotor excitation arrest point, thus reducing the speed variation (uneven rotation) and vibration by a so-called micro-step drive method.

However, there were problems with these methods of reducing the speed variation (uneven rotation) and vibration of the stepping motor by providing additional external factors. They lead to bulkiness and increased weight of the system, and further picture quality improvement could not be expected. Also, even if the micro-step drive method was adopted for the stepping motor, if there was randomness of the torque characteristics between one excitation phase and another, marked improvement of picture quality could not be expected.

Consequently, it was not possible to simply and effectively reduce the speed variation or uneven rotation, and vibration of the stepping motor.

SUMMARY OF THE INVENTION

It is an object of the present invention to provide an image forming apparatus which can reduce the speed variations, in other words uneven rotation, and vibration of the stepping motor without making additional external factors necessary or requiring structural alterations.

According to one aspect of the present invention, there is provided an image forming apparatus for producing a visible image on an image forming medium, comprising means for carrying a latent image thereon; means for rotating the carrying means, the rotating means having a stepping motor which has a plurality of exciting windings; means for driving the rotating means; and means for controlling the driving means such that the plurality of exciting windings are switched to be excited in a prescribed manner, the controlling means periodically varying the switching time intervals for exciting the windings in correspondence to variations in the rotational speed of the rotating means.

DETAILED DESCRIPTION OF THE PREFERRED EMBODIMENT

Referring to the accompanying drawings, a detailed description will subsequently be given of the preferred embodiment of the present invention.

Figure 1:
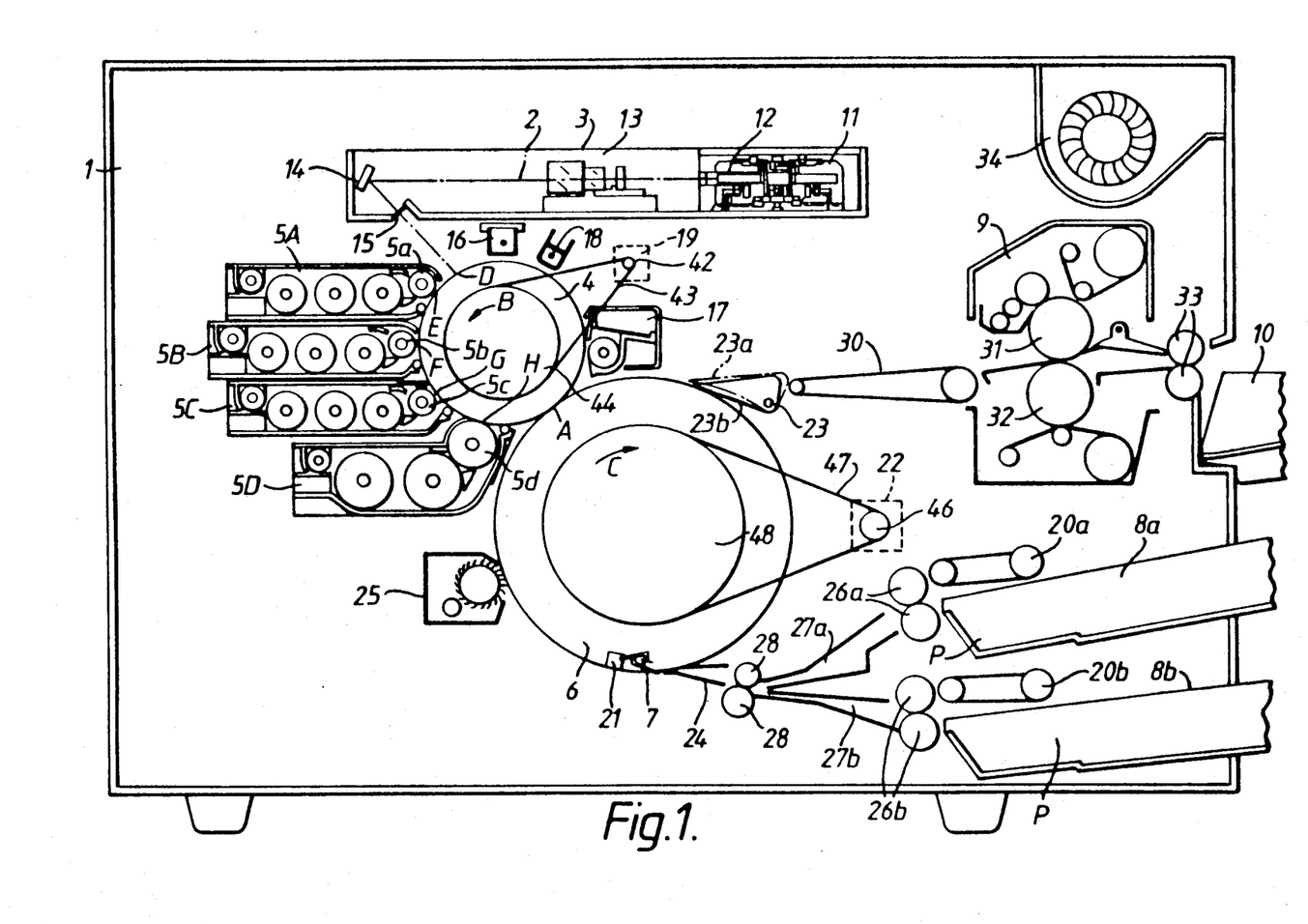
FIG. 1 is a sectional view showing a color printer as an image forming apparatus of the present invention.

FIG. 1 is a sectional view which schematically shows the internal construction of a laser beam printer as an image forming apparatus of the present invention. This laser beam printer 1 is supplied sequentially with image data which has been dot-resolved into each color component from an external host or an original document reading apparatus which are not shown. Laser beam printer 1 forms an electrostatic latent image by sequentially irradiating the image data for each color component onto pre-charged photosensitive drum 4 by laser beam 2 via the mirrors and lenses of optical exposure unit 3. Photosensitive drum 4 forms a toner image by turning the electrostatic latent image formed by laser beam 2 into a visible image by attracting the first color toner from developer 5A. At the same time, gripper 7 provided on transferring drum 6 grips copy paper P, which was stored in paper supply cassettes 8a and 8b, and moves the copy paper P to the outer surface of transferring drum 6. Photosensitive drum 4 and transferring drum 6 face each other while maintaining a state of contact at point A. By rotating photosensitive drum 4 and transferring drum 6 in the directions of arrows B and C respectively at the same outer circumference speed, the first color toner image formed on photosensitive drum 4 is transferred onto copy paper P. When the transferring of the first color toner image onto copy paper P is completed, photosensitive drum 4 and transferring drum 6 are caused to separate from the in-contact state by a separation mechanism (not shown) so that there is a gap of 2-3 mm between them. Then transferring drum 6 is rotated a specified amount (corresponding to the length of the toner image) in the reverse direction to the direction C in which it rotated when the toner image was transferred. When transferring drum 6 is rotated a specified amount in the reverse direction, copy paper P becomes in the state in which photosensitive drum 4 and the initial position at point A are facing each other. Also, while photosensitive drum 4 is rotated in direction B, set in a position in which transferring can be re-commenced when the initial position has arrived at point A. By this means, the transferring of the second color, third color and fourth color toner images is then carried out in sequence onto copy paper P. Then, when the transferring is completed, copy paper P is peeled from transferring drum 6 and is conveyed to fixing unit 9. The toner image is fixed on copy paper P by fixing unit 9 and copy paper P is then dispensed to receiving tray 10.

Figure 2:
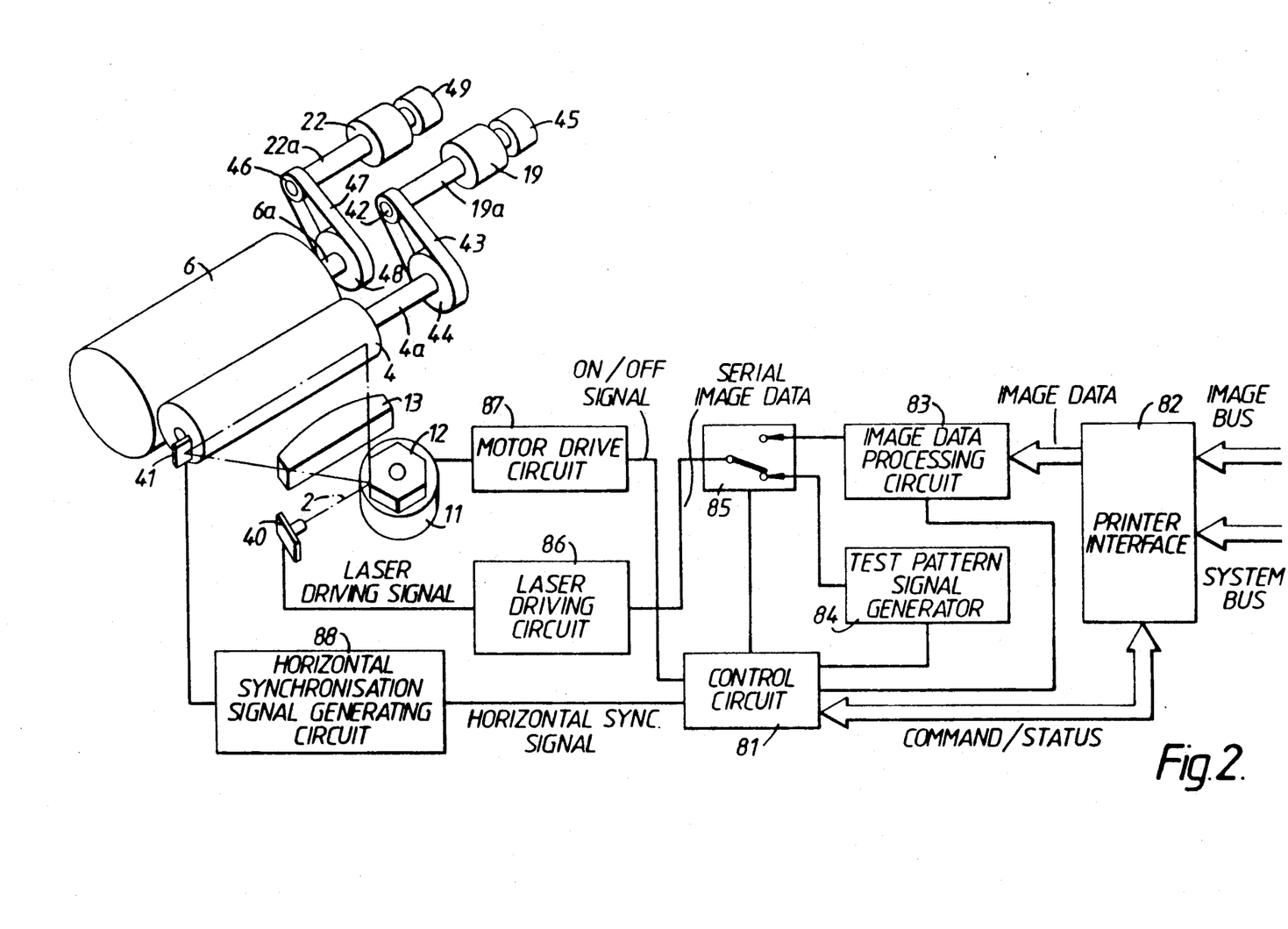
FIG. 2 is a diagram showing the schematic construction of the optical exposure unit and schematic construction block of part of the electrical circuit.

Optical exposure unit 3 is arranged in the upper part of laser beam printer 1, as shown in FIGS. 1 and 2. Optical exposure unit 3 comprises semiconductor laser diode 40, high-speed rotating motor 11, polygon mirror 12, optical lens 13, reflector mirror 14 and protective glass 15. In this optical exposure unit 3, laser beam 2, which is generated from semiconductor laser diode 40 in response to image data, is corrected by a beam correction optical unit (not shown) composed of, for instance a cylindrical lens, etc. Also, laser beam 2 is deflected by polygon mirror 12 rotated by high-speed rotating motor 11 and is controlled by motor drive circuit 87 described below. Then, deflected laser beam 2 passes through optical lens 13 and is reflected by mirror 14. Then, laser beam 2 passes through protective glass 15, forms a spot image at the position of exposure position D on photosensitive drum 4.

Laser beam receiving element 41 is provided on the side of photosensitive drum 4, outside the image formation area of the scanning line scanned by laser beam 2, as shown in FIG. 2. Laser beam receiving element 41 detects laser beam 2 prior to each scan and outputs this detection signal to horizontal synchronisation signal generating circuit 88, which is described below.

Charger 16 which charges the drum surface, developers 5A to 5D for each color, transferring drum 6 which rotates with copy paper P adhering to the drum surface, cleaner 17 and erasure discharge lamp 18 are arranged round the periphery of photosensitive drum 4 in the direction of rotation B, as shown in FIG. 1. Photosensitive drum 4 is always driven in rotation by stepping motor 19, and the drum surface is charged by charger 16. Laser beam 2 forms a spot image at the point of exposure, position D, on the drum surface of charged photosensitive drum 4. As a result, an electrostatic latent image is formed by the charge being removed in response to laser beam 2. When photosensitive drum 4 on which this electrostatic latent image has been formed is rotated in the direction of arrow B to the point of developing position E, it comes onto contact with developer 5A and yellow toner is supplied to and attracted onto photosensitive drum 4 from developer sleeve 5a.

Apart from developer 5A, developer 5B which has developer sleeve 5b in which magenta toner is stored, developer 5C having developer sleeve 5c in which cyan toner is stored and developer 5D having developer sleeve 5d in which black toner is stored are respectively arranged adjacent to each other. These developers 5A to 5D are usually separated from photosensitive drum 4 via a small gap. When the transferring of a color toner image onto copy paper P is required, developers 5A to 5D are respectively successively shifted to the points of the developing positions E, F, G and H of photosensitive drum 4 by means of moving mechanisms (not shown). For instance, the toner image formed by the first color yellow toner is transferred onto paper P at the point of transferring position A of photosensitive drum 4 and, after this transferring is completed, in the interval until transferring of the second color commences, developer 5B for the second color magenta is shifted to the point of developing position F of photosensitive drum 4.

Photosensitive drum 4, on which a toner image has been formed by attracting any one color toner, continues to rotate, and, at the point of transferring position A, that toner image is transferred onto copy paper P. After transferring at transferring position A, photosensitive drum 4 continues to rotate further in the direction of arrow B, and the residual toner on photosensitive drum 4 is removed by cleaner 17. Then, any residual potential on the surface of photosensitive drum 4 is removed by illuminating from erasure discharge lamp 18.

As shown in FIG. 2, the rotating force from stepping motor 19 is transmitted to pulley 44, which is linked to rotating spindle 4a of photosensitive drum 4, via pulley 42, which is linked to drive spindle 19a of stepping motor 19, and timing belt 43. Also, in stepping motor 19, encoder 45 for detecting the speed of rotation and variations in rotation is linked to drive spindle 19a. Encoder 45 outputs a pulse signal in response to the rotation speed of stepping motor 19. When the rotation speed of stepping motor 19 slows down, the outputted pulse time intervals becomes wider (longer), and when it speeds up, the outputted pulse time intervals becomes narrower (shorter).

As shown in FIG. 1, gripper 7 for gripping copy paper P, and sensor 21, which detects that gripper 7 is holding copy paper P supplied by paper supply rollers 20a or 20b, are provided on transferring drum 6. Transferring drum 6, under the rotational drive of stepping motor 22, rotates in the direction of arrow C during the transferring onto copy paper P of the toner image formed on photosensitive drum 4. When the transferring of the toner image is completed it rotates in the reverse direction to photosensitive drum 4, that is the reverse direction to arrow C just by the distance of the toner image. Movable guide plate 23 guide 24 and transferring drum cleaner 25 are arranged round the periphery of transferring drum 6. One end of movable guide plate 23 is pivotted and the other end of that is free to make contact with or separate from transferring drum 6.

As shown in FIG. 2, the rotating force from stepping motor 22 is transmitted to pulley 48, which is linked to rotating spindle 6a of transferring drum 6, via pulley 46, which is linked to drive spindle 22a of stepping motor 22, and timing belt 47. Also, in stepping motor 22, encoder 49 for detecting the speed of rotation and variations in rotation is linked to drive spindle 22a. Encoder 49 outputs a pulse signal in response to the rotation speed of stepping motor 22. When the rotation speed of stepping motor 22 slots down, the outputted pulse time intervals become wider (longer), and when it speeds up, the outputted pulse time intervals become narrower (shorter).

Copy paper P stored in paper supply cassette 8a (8b) is supplied by the rotation of paper supply roller 20a (20b), 1 sheet at a time, via transport roller 26a (26b), transport guide 27a (27b) and transport roller 28. Then, gripper 7 holds the leading edge of that copy paper P. Next, by applying a bias voltage to transferring drum 6, copy paper P adheres to transferring drum 6 with electrostatic force. Also, when copy paper P is held by gripper 7, sensor 2 which is provided on the end of the drum detects that copy paper P is being held and outputs a detection signal to control circuit 81, described below. Transferring drum 6 to which copy paper P has mounted rotates in the direction of arrow B to the point of transferring position A of photosensitive drum 4. When the leading edge of copy paper P reaches the point of transferring position A of photosensitive drum 4, stepping motor 19 is rotated in response to pulse signals from driving circuit 71 controlled by control circuit 81. Then, while transferring drum 6 is rotating together with photosensitive drum 4, the toner image formed on photosensitive drum 4 is transferred onto copy paper P. When the transferring is completed by the trailing edge of copy paper P passing beyond the point of transferring position A on photosensitive drum 4, control circuit 81 actuates the separation mechanism (not shown) which causes photosensitive drum 4 and transferring drum 6 to separate so that there is a gap of 2–3 mm between them. When this separation is completed, control circuit 81 causes transferring drum 6 to rotate in the reverse direction, that is the reverse direction of arrow C, by just the size of copy paper P by outputting a pulse signal to stepping motor 22. This series of operations is repeated until, for instance, full-color transferring, in which four colors are superimposed, is completed.

When the transferring of the toner images of all the colors is completed, movable guide plate 23 contacts transferring drum 6 by moving from a position (23a), which is, for instance, separated several centimeters from the surface of transferring drum 6, towards 23b due to a signal from control circuit 81. By this means, copy paper P which is adhering to transferring drum 6 is peeled by movable guide plate 23. Copy paper P is then conveyed to fixing unit 9 via conveyor 30, and is conveyed between heat roller 31 and pressure roller 32 inside fixing unit 9. After the toner image has been thermally fixed on copy paper P by heat roller 31 and pressure roller 32, copy paper P which has been thus conveyed is further conveyed by exit roller 33, and is dispensed to receiving tray 10.

Cooling fan 34 is to prevent the temperature inside laser beam printer 1 becoming too high by cooling the heat exhausted from heat roller 31 of fixing unit 9, etc.

The construction of stepping motor 19 (22) and its driving circuit 71 (72) is described, referring FIGS. 3 to 6. Stepping motor 19 (22) comprises rotor 51 and stator 52. Each rotor 51 is linked to photosensitive drum 4 and transferring drum 6, respectively.

Figure 3:
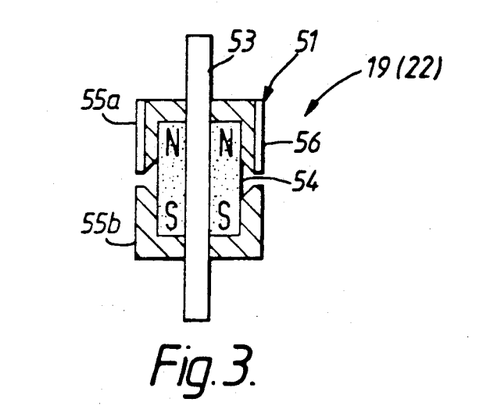
FIG. 3 is a vertical cross-section of a rotor of a stepping motor.
Figure 4:
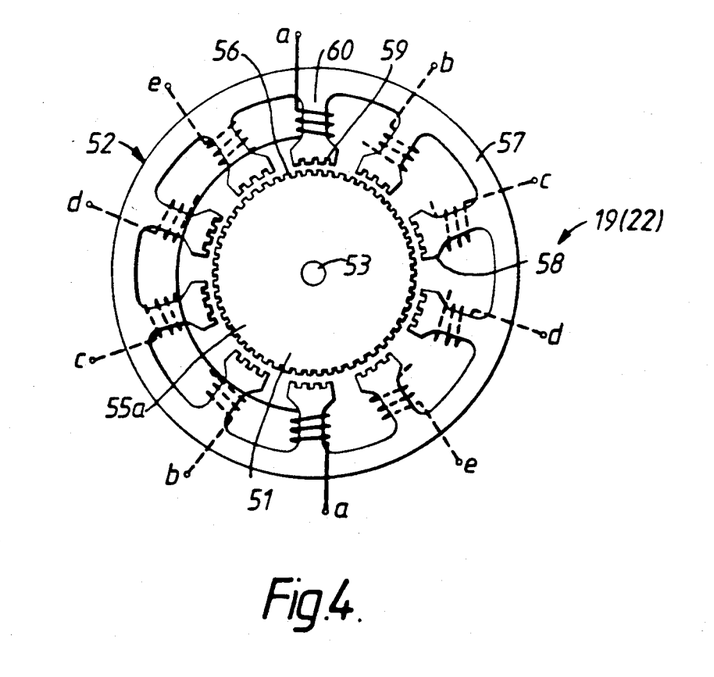
FIG. 4 is a plan view of a stator of the stepping motor in which the rotor is assembled.

As shown in FIG. 3, rotor 51 comprises spindle 53 formed of non-magnetic material, permanent magnet 54 provided round the periphery of spindle 53 and magnetised along the direction of the spindle, and toothed cups 55a and 55b made of magnetic material and fitted respectively on each end of permanent magnet 54 in the form of caps. In this example, 50 small teeth 56 are formed at equal pitch in the circumference direction on each of toothed cups 55a and 55b. The small teeth 56 on toothed cup 55a and the small teeth 56 on toothed cup 55b are provided with a phase difference of ½ pitch in the circumference direction. As shown in FIG. 4, stator 52 is constructed of stator core 57 which is positioned so that it surrounds rotor 51, ten stator salient poles 58 which are arranged to project from the surface of stator 57, small teeth 59 which are provided at equal pitch on the ends of stator salient poles 58, and excitation windings 60 which are wound round stator salient poles 58. Each excitation winding 60 is connected, either in series or in parallel, only to the winding fitted on the mutually opposite stator salient pole. Thus, there is a 5-phase composition, which is divided into five excitation phases, a, b, c, d and e.

Figure 5:
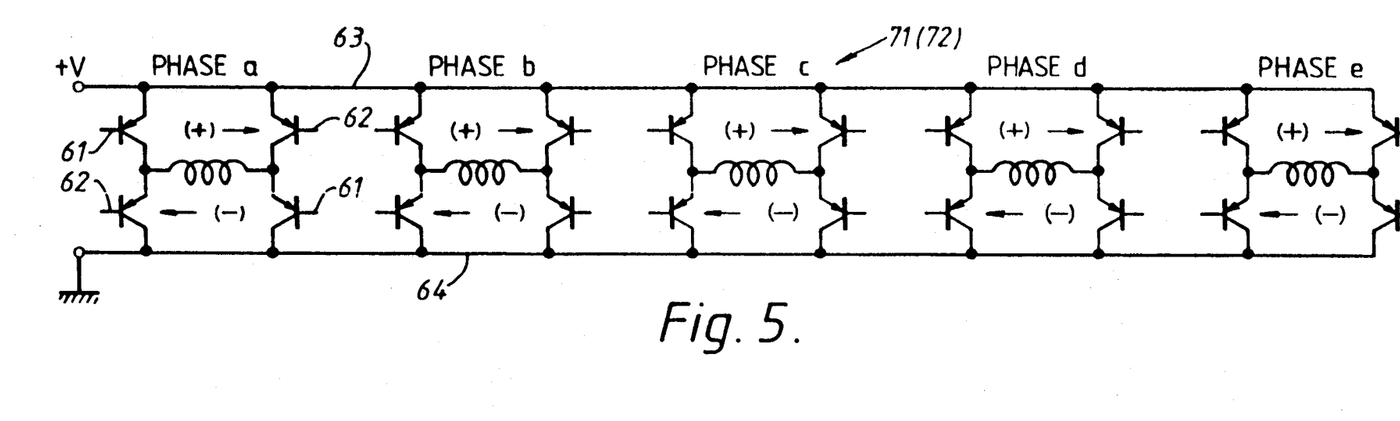
FIG. 5 is a schematic diagram of the driving circuit of the stepping motor.

As shown in FIG. 5, driving circuit 71 (72) is constructed so that the two ends of the excitation windings which compose each excitation phase are connected respectively to electric power lines 63 and 64 via power transistors 61 and 62. By switching ON and OFF in sequence diagonal lines, positive or negative currents are caused to low in the excitation windings, and magnetic fields are generated between stator 52 and rotor 51.

Figure 6:
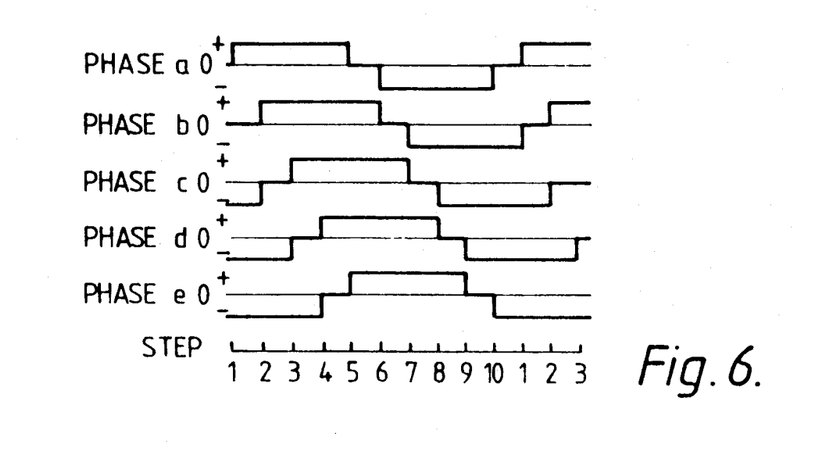
FIG. 6 is a chart showing the operating sequence of the driving circuit in FIG. 5.

Also, driving circuit 71 (72) is constructed so that, in response to output pulses from timing signal generator circuit 90 (91) described below, as shown by the representative excitation sequence in FIG. 6, it outputs a base signal which controls power transistors 61 and 62 to ON and OFF to cause excitation currents to flow in each excitation winding phase. This example is designed for the repetition of 10 steps. Also, the supply of power to power line 63 is controlled by the excitation signals from timing signal generator circuit 90 (91).

Moreover, when a reverse rotation signal is supplied from control circuit 81 described below, driving circuit 72 outputs a base signal which controls power transistors 61 and 62 to ON and OFF to cause excitation currents to flow in each excitation winding phase in a reverse sequence which differs from that in FIG. 6.

Figure 7:
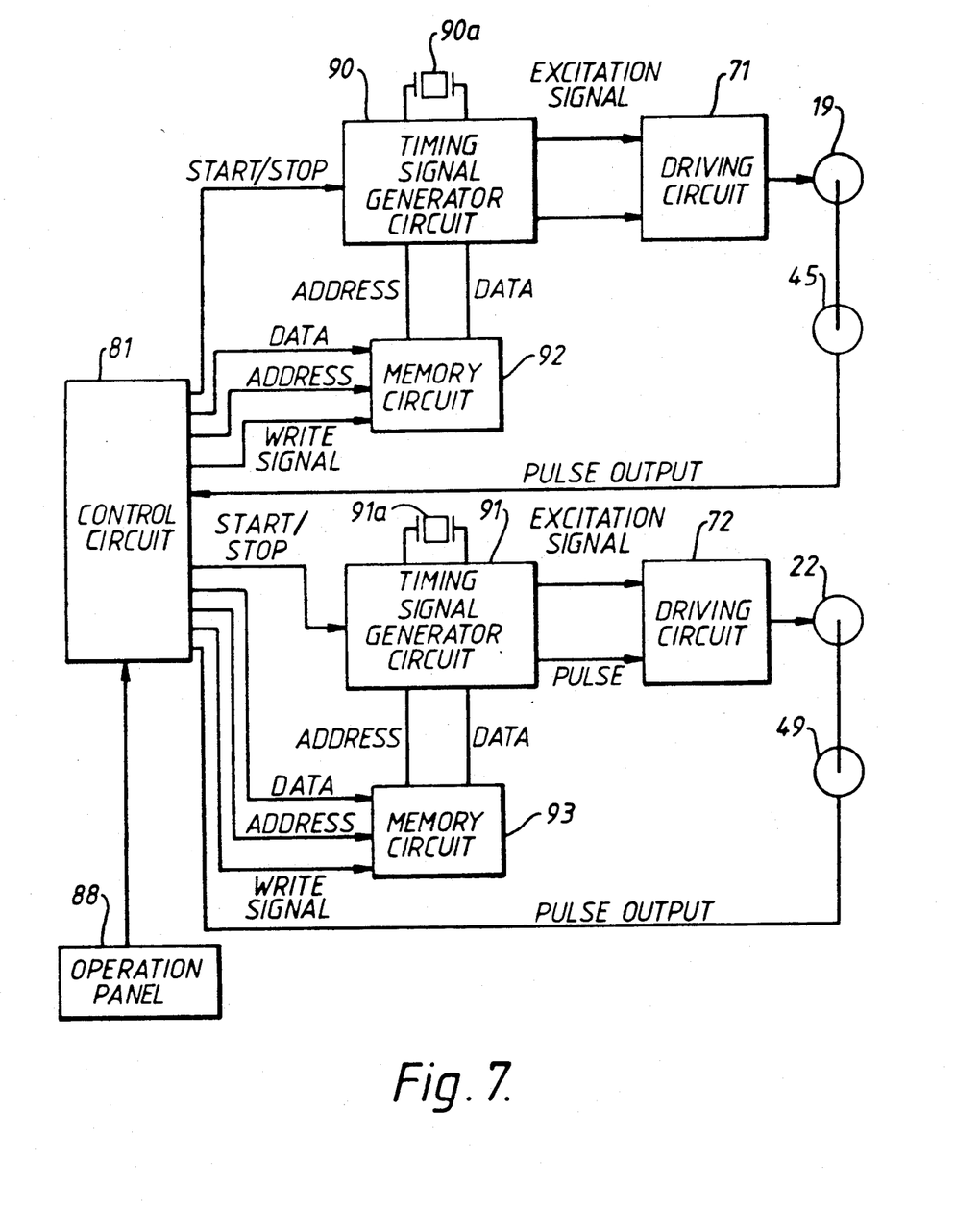
FIG. 7 is a block diagram showing the schematic construction of a part of the electrical circuit.

FIGS. 2 and 7 are block diagrams of essential parts of the electrical circuit for laser beam printer 1 shown in FIG. 1. The electrical circuit comprises control circuit 81 which performs various controls and operations, printer interface 82, image data processing circuit 83, test pattern signal generator 84, selector circuit 85, laser driving circuit 86, motor driving circuit 87, horizontal synchronisation signal generating circuit 88, operation panel 89, timing signal generator circuits 90 and 91, and memory circuits 92 and 93.

Printer interface 82 outputs to control circuit 81 the various command signals which are supplied via a system bus from a host (not shown) and at the same time outputs the status signals from control circuit 81 to the host via the system bus. Also, printer interface 82 receives the image data supplied via the image bus from the host, and outputs them to image data processing circuit 83.

Image data processing circuit 83 records one page of the image data supplied from printer interface 82, and outputs these recorded image data (parallel data) to selector circuit 85 by converting them to serial image data.

Test pattern signal generator 84, by command of control circuit 81, generates a serial image data of test pattern which will show up random rotation, and outputs this to selector circuit 85.

At the command of control circuit 81, selector circuit 85 outputs to laser driving circuit 86 the image data supplied from image data processing circuit 83 when image data from the host are printed, and outputs to laser driving circuit 86 the image data supplied from test pattern signal generator 84 when the test pattern is printed.

Laser driving circuit 86 drives semiconductor laser diode 40 in accordance with the image data supplied from selector circuit 85, and causes semiconductor laser diode 40 to generate a laser beam.

Motor driving circuit 87, by command of control circuit 81, rotates the high-speed rotating motor 11 at high speed.

Horizontal synchronisation signal generating circuit 88 generates the necessary horizontal synchronising signals as reference positions (timing) when a electrostatic latent image is formed on photosensitive drum 4 by the laser beam.

Operation panel 89 is operated by the operator, and is designed to produce such commands as the print start command, the output command for the test pattern, the setting commands for speed variation data to memory circuits 92 and 93 and the selection commands (the rotation mode switching commands) for the speed variation data to memory circuits 92 and 93.

Timing signal generator circuit 90 controls the output of excitation signals to driving circuit 71 by start/stop signals from control circuit 81. Also, by speed variation data supplied from memory circuit 92 and a clock signal formed by the oscillation output from crystal oscillator 90a, timing signal generator circuit 90 generates a timing pulse in accordance with the speed variation data and outputs this to driving circuit 71.

Timing signal generator circuit 91 controls the output of excitation signals to driving circuit 72 by start/stop signals from control circuit 81. Also, by speed variation data supplied from memory circuit 93 and a clock signal formed by the oscillation output from crystal oscillator 91a, timing signal generator circuit 91 generates a timing pulse in accordance with the speed variation data and outputs this to driving circuit 72.

Memory circuit 92 stores excitation switching timing data as speed variation data for reducing the speed variation, in other words random rotation, of stepping motor 19. Memory circuit 92 outputs excitation switching timing data to timing signal generator circuit 90 for the address designated by an address (upper bit) from control circuit 81 and an address lower bit) from timing signal generator circuit 90.

Memory circuit 93 stores excitation switching timing data as speed variation data for reducing the speed variation, in other words random rotation, of stepping motor 22. Memory circuit 93 outputs excitation switching timing data to timing signal generator circuit 91 for the address designated by an address (upper bit) from control circuit 81 and an address (lower bit from timing signal generator circuit 91.

Also, memory circuits 92 and 93 are supplied with write signals from control circuit 81 and, at the same time, when the excitation switching timing data, obtained through calculation of the encode data detected by encoders 45 and 49, and an address are supplied, they are designed to store the excitation switching timing data at that address.

Figure 8:
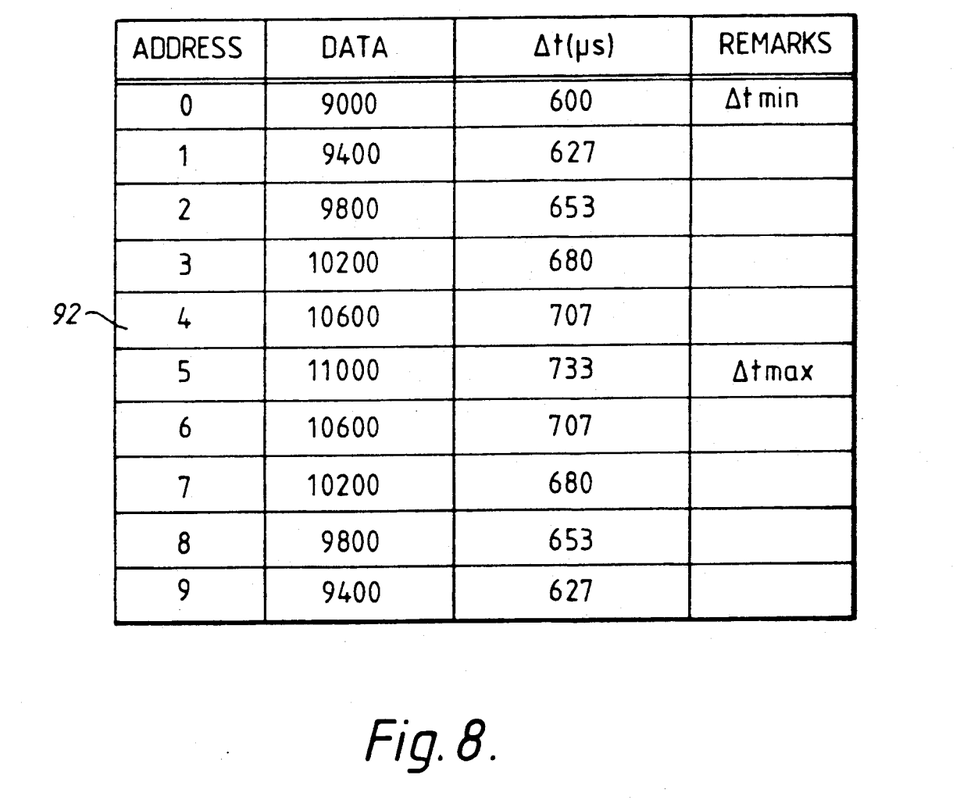
FIG. 8 is a map showing examples of records of the excitation switching timing data stored in a memory circuit.

In memory circuit 92, when, for instance, stepping motor 19 is caused to rotate at 1500 pps, the variation pulse rate, which causes the time intervals which switch the excitation to vary with periodicity, is stored as speed variation data (excitation switching timing data). With a 10-pulse period, if the pulse rate is taken as fluctuating $\pm 10\%$, as shown in FIG. 8, excitation switching timing data '9000' and switching time '600 $\mu s$' are stored at address '0', excitation switching timing data '9400' and switching time '627 $\mu s$' are stored at address '1', excitation switching timing data '9800' and switching time '653 $\mu s$' are stored at address '2', excitation switching timing data '10200' and switching time '680 $\mu s$' are stored at address '3' excitation switching timing data '10600' and switching time '707 $\mu s$' are stored at address '4', excitation switching timing data '11000' and switching time '733 $\mu s$' are stored at address '5', excitation switching timing data '10600' and switching time '707 $\mu s$' are stored at address '6', excitation switching timing data '10200' and switching time '680 $\mu s$' are stored at address '7', excitation switching timing data '9800' and switching time '653 $\mu s$' are stored at address '8', and excitation switching timing data '9400' and switching time '627 $\mu s$' are stored at address '9'. This is the same as the excitation being switched every 1/1500 seconds (666.7 $\mu s$) (mean value).

The design is also such that, for instance, the excitation switching timing data for stepping motor 22 is stored in memory circuit 93.

The excitation switching timing data for memory circuits 92 and 93 may either be pre-set during production of the apparatus or may be set by the operator. In the case of its being pre-set during production, there is no requirement to provide encoders 45 and 49. In the case of its being set by the operator, the design may be such that excitation switching timing data obtained by the computing of the encode data detected by using encoders 45 and 49 is set. Or the design may be such that an excitation switching timing data sequence is selected from the differing excitation switching timing data sequences stored in memory circuits 92 and 93 by referring output examples (actual print example) of these, without using encoders 45 and 49.

The case of setting in memory circuit 92 excitation switching timing data obtained by the computation of encode data detected by encoder 45 is now described. When the image forming operation is not performed at the time of adjustment or immediately after switching-on the power source, or when the operator designates from operation panel 89, pulses of a specified timing are outputted to driving circuit 71 from timing signal generator circuit 90 by means of a start signal from control circuit 81. For instance, when the oscillation frequency of oscillator 90 is 15 MHz, a pulse is outputted every 1/1500 (666.7 $\mu s$). By this means, driving circuit 71 rotates stepping motor 19 in response to this pulse. At this time, stepping motor 19 is rotated without regard to speed variation, that is to say random rotation. The encoded output from encoder 45 (a signal of about 200 pulses is outputted from encoder 45 for one pulse of stepping motor 19) obtained by rotation which includes this speed variation is outputted to control circuit 81. Control circuit 81 produces excitation switching timing data for every one pulse of stepping motor 19 in response to the number of pulses from encoder 45, and outputs the address and the excitation switching timing data to memory circuit 92. By this means, an excitation switching timing data sequence with a 10-pulse period for reducing the speed variation or random rotation of stepping motor 19, as shown in FIG. 8, is stored in memory circuit 92. Also, the excitation switching timing data of memory circuit 93 for stepping motor 22 in response to the encoded output from encoder 49 is stored in the same way as the storage in memory circuit 92 described above.

Figure 9A:
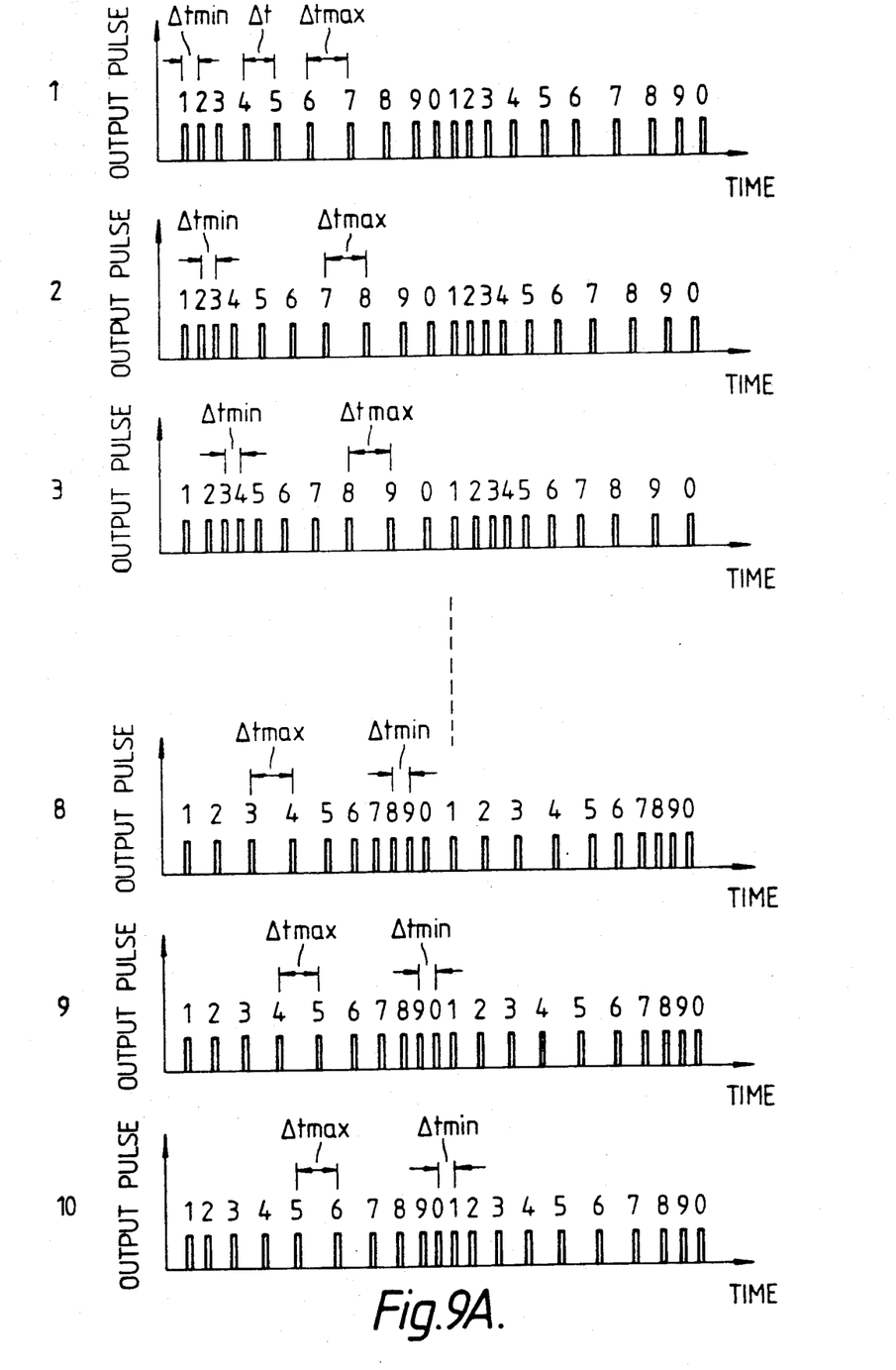
FIG. 9A is a diagram showing examples of the pulse output of the timing signal generator circuit.
Figure 9B:
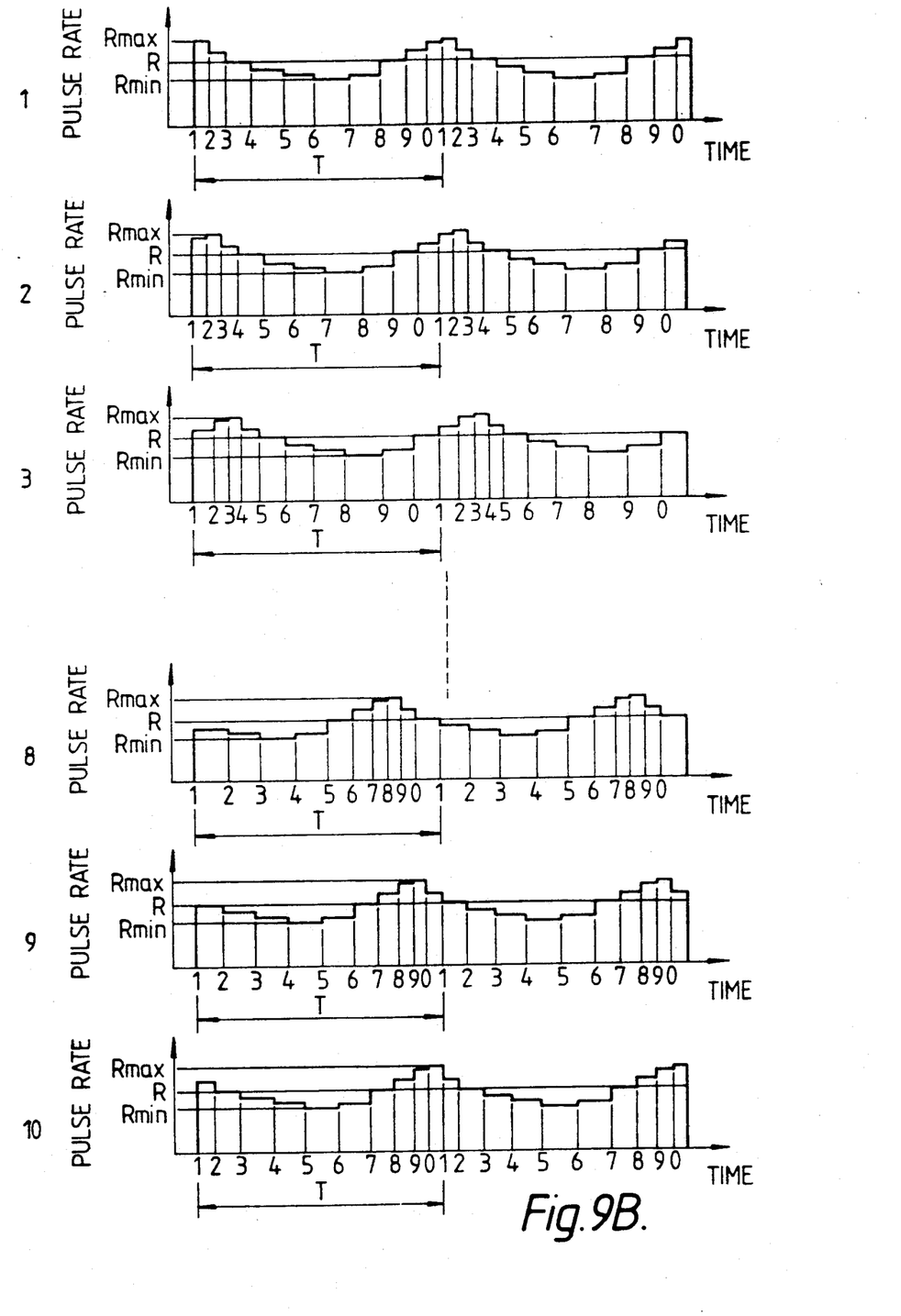
FIG. 9B is a diagram showing examples of the pulse output in FIG. 9A converted to pulse rate.

The process of selecting one of a number of differing excitation switching timing data sequences for excitation switching timing in memory circuit 92 will now be described. In this case, differing excitation switching data sequences of excitation switching timings "1–10" are stored in memory circuit 92, as shown in FIG. 9A. Examples of these excitation switching timing data sequences converted to pulse rates are shown in FIG. 9B.

Figure 10A:
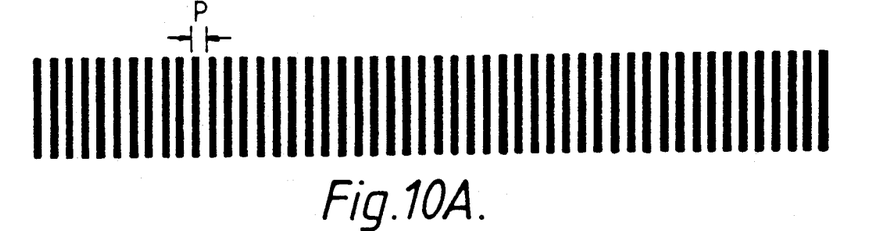
FIG. 10A and 10B are diagrams showing examples of the print out of the test pattern.
Figure 10B:
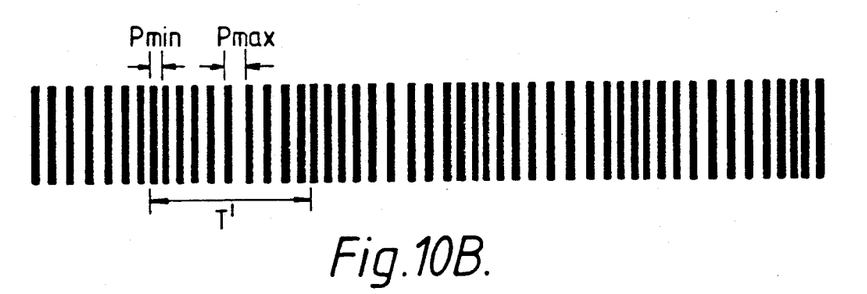

When the operator so designates from operation panel 89, control circuit 81 outputs a selection signal for excitation switching timing data sequence "1" to memory circuit 92. By this means, stepping motor 19 is rotated through pulses corresponding to excitation switching timing data sequence "1" being outputted to driving circuit 71 by causes a test pattern to be generated from test pattern signal generator 84, and outputs this test pattern to laser driving circuit 86 via selector circuit 85. By this means, a laser beam corresponding to the test pattern is generated from semiconductor laser diode 40 by laser driving circuit 86. Thereafter, after exposing and transferring have been carried out, the test pattern is printed on copy paper P, and is dispensed. Printing of the test patterns corresponding to the other excitation switching timing data "2–10" are also executed in the above way. By this means, as shown in FIG. 10A and 10B, when the test patterns have been printed, FIG. 10A is a pattern in which speed variation has been eliminated, in other words, the pattern has become of equally-spaced pitch P, and one with which there will be no image randomness. FIG. 10B is a pattern which includes speed variation and with which image randomness would occur, in other words, dense portions Pmin of 1 dot-line pitch and coarse portions Pmax have appeared. As the result of this, the operator, having checked the print quality of the printed test patterns, designates the selection of the pattern which has been most accurately printed (the speed variation or random rotation is reduced) using operation panel 89. For instance, the operator designates the excitation switching timing data sequence corresponding to the print in FIG. 10A. Thereafter, when stepping motor 19 is rotated, that selected excitation switching timing data sequence is outputted from memory circuit 92.

When the printing the test pattern for the multiple excitation switching timing data sequences in memory 92 is executed, stepping motor 22 is driven by constant-interval pulses. After this, the selection of an excitation switching timing data sequence from memory circuit 93 for stepping motor 22 is performed in the same way as the above selection from memory circuit 92.

Figure 11:
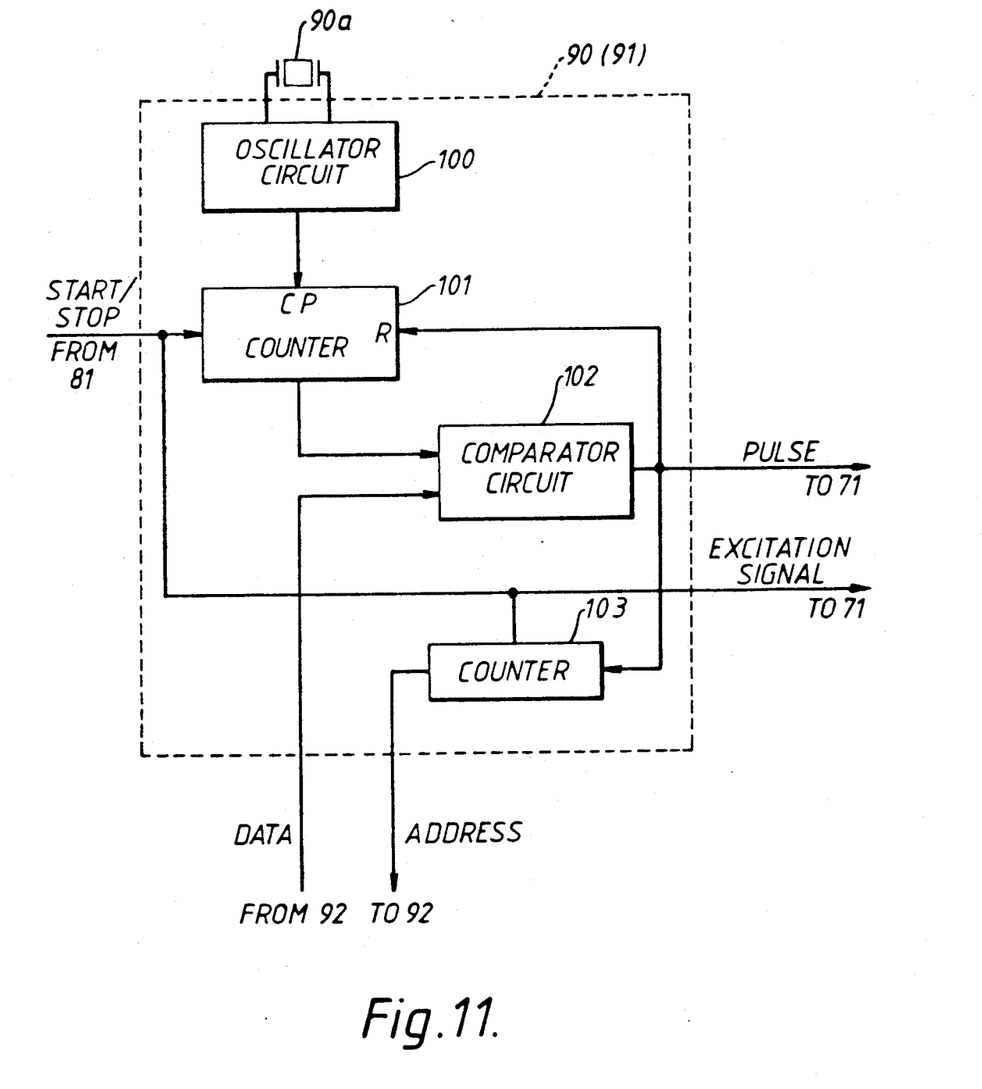
FIG. 11 is a diagram showing the construction of the timing signal generator circuit.

Timing signal generator circuit 90 (91) is now described in detail, referring to FIG. 11. Timing signal generator circuit 90 comprises oscillator circuit 100, counter 101, comparator circuit 102 and counter 103. Oscillator circuit 100 generates a clock signal which is determined by the frequency of crystal oscillator 90a, and this clock signal is outputted to counter 101. Counter 101 counts the clock signal from oscillator circuit 100, being reset by a pulse from comparator circuit 102, and starts/stops the count operation in response to start/stop signals from control circuit 81. Comparator circuit 102 compares the number of counts from counter 101 with the speed variation data (excitation switching timing data) from memory circuit 92, and outputs a pulse when they agree. Counter 103 counts the number of output pulses from comparator circuit 102, and starts/stops the count operation in response to start/stop signals from control circuit 81. The number of count from counter 103 is outputted to memory circuit 92 as an address.

The case of stepping motor 19 being rotated at 1500 pps in response to excitation switching timing data from memory circuit 92 is not explained. A start signal from control circuit 81 is outputted to counters 101 and 103. This start signal is also outputted to driving circuit 71 as an excitation signal. At this time, counter 101 commences counting in response to the clock signals from oscillator circuit 100. Also, counter 103 is at '0', and so address '0' is outputted to memory circuit 92. When this is done, memory circuit 92 outputs excitation switching timing data '9000' at address '0' to comparator circuit 102.

Then, when the count value of counter 101 has become '9000' (when 600 μs has elapsed), a pulse is outputted as an agreement signal from comparator circuit 102 to driving circuit 71. By this means, driving circuit 71 rotates stepping motor 19 by 1 pulse. Also, counter 101 is reset by the pulse from comparator 102 and starts to count from '0', and counter 103 is caused to count up and its count content '1' is outputted to memory circuit 92 as address '1'. When this is done, memory circuit 92 outputs excitation switching timing data '9400' of address '1' to comparator circuit 102. After this, each time a pulse is outputted from comparator circuit 102, the excitation switching timing data of the corresponding address in memory circuit 92 is read out, and when the time corresponding to this excitation switching timing data has elapsed, the next pulse is outputted from comparator circuit 102. By this means, pulses are outputted from comparator circuit 102 at time intervals such shown in FIG. 12A. Therefore, since the speed variation of stepping motor 19 is taken into consideration and the excitation timing of each excitation phase a, b, c, d, and e is controlled, the speed variation is cancelled out and it is rotated smoothly.

Figure 12A:
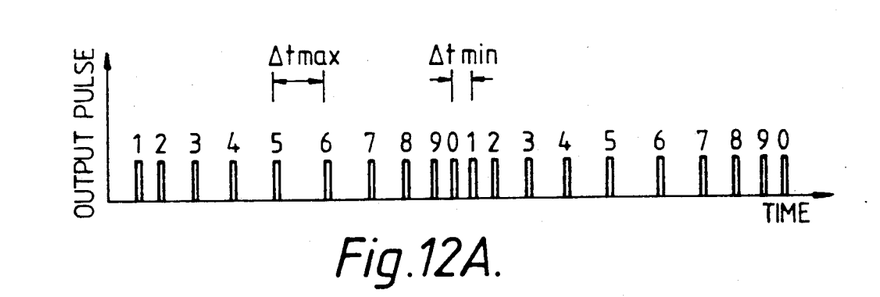
FIG. 12A is a diagram showing an example of the pulse output of the timing signal generator circuit.

FIG. 12A shows the excitation switching timing when stepping motor 19 is driven to rotate at constant speed. The excitation of the excitation windings composing each phase is switched in accordance with this switching timing. In driving circuit 71, taking a time interval of the excitation switching timing as Δt as a reference, this is caused to fluctuate between Δtmin and Δtmax. The inverse of this time interval is the pulse rate and, as shown in FIG. 12B, this pulse fluctuates in a sine-wave form with period T.

Figure 12B:
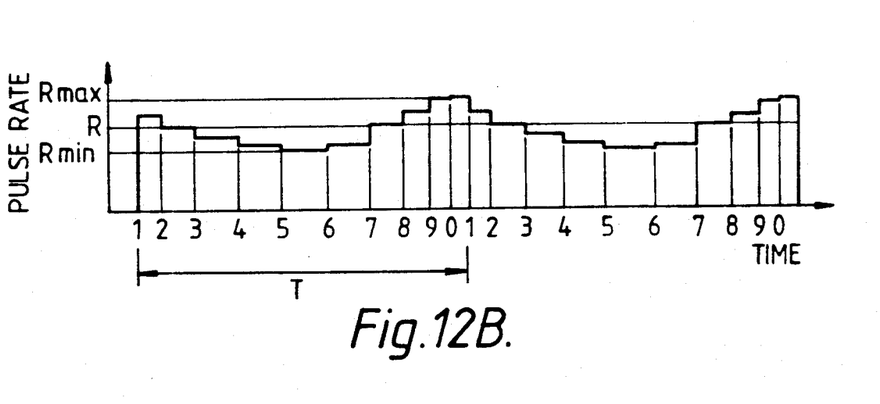
FIG. 12B is a diagram showing an example of the pulse output in FIG. 11A converted to pulse rate.

If stepping motor 19 had no inherent speed variation, stepping motor 19 would rotate with a speed variation of period T, as shown in FIG. 12B. However, an inherent speed variation always exists in a normal stepping motor. Driving circuit 71 makes period T agree with the inherent speed variation period of the stepping motor, and also causes the time interval of the excitation switching timing, in other words the pulse rate, to fluctuate so that it becomes almost reverse phase. Consequently, if the amplitude is taken as having been appropriately set, it is possible to cancel out the inherent speed variation of the stepping motor by a speed variation which follows the pulse rate variation, and rotor 51 can be made to rotate smoothly.

In the case of stepping motor 22 also, in the same way as in the case of stepping motor 19, it can be made to rotate smoothly by cancelling out the inherent speed variation of the stepping motor.

The operation of this image forming apparatus with the above construction is explained.

First, the image data which have been resolved into each color component are supplied to printer interface 82 from the host via the image bus, and command information such as the size of copy paper P and the transferring density, in other words each type of command, is supplied to printer interface 82 from the host. When this has been done, each type of command which has been supplied to printer interface 82 is supplied to control circuit 81. Control circuit 81 rotates high-speed rotating motor 11 at high speed by controlling motor drive circuit 87, rotates stepping motor 19 by controlling driving circuit 71 via timing signal generator circuit 90, and rotates stepping motor 22 by controlling driving circuit 72 via timing signal generator circuit 91.

Also, after the image data supplied to printer interface 82 have been converted into serial image data in image data processing circuit 83, they are outputted to laser driving circuit 86 via selector circuit 85. By this means, laser driving circuit 86 drives semiconductor laser diode 40 in accordance with the image data supplied from selector circuit 85, and causes a laser beam to be produced by semiconductor laser diode 40. Laser beam 2 which is generated by semiconductor laser diode 40 is corrected by the optical correction system and is deflected by polygon mirror 12. After deflected laser beam 2 has passed through optical lens 13, it is reflected by mirror 14 and passes through protective glass 15 and is then caused to scanexpose by being formed into a spot beam of the required resolution at point D on the surface of photosensitive drum 4. Photosensitive drum 4 has previously been charged by charger 16, and an electrostatic latent image is formed corresponding to the original image by the charge being discharged by laser beam 2 which passes through protective glass 15 and is irradiated, photosensitive drum 4 on which this electrostatic latent image has been formed comes into contact with developer sleeve 5a, which transports the yellow toner stored in developer 5A, at the point of developing position E. Through this contact, a toner image is formed by the yellow toner being attracted onto the electrostatic latent image on photosensitive drum 4.

Photosensitive drum 4 on which the toner image has been formed continues to rotate while maintaining a state of contact with transferring drum 6. While photosensitive drum 4 is continuing to rotate, paper supply roller 20a (20b) is driven and the leading edge of copy paper P which is stored in paper supply cassette 8a (8b) is supplied to gripper 7 of transferring drum 6. Copy paper P which has been supplied adheres to the surface of transferring drum 6 due to its having been impressed with a bias voltage and, at the same time, is held by gripper 7 of transferring drum 6. When copy paper P is held by gripper 7, sensor 21 detects that copy paper P is held, and outputs a detection signal to control circuit 81. Transferring drum 6, together with copy paper P which is held by gripper 7, continues to rotates in the direction of arrow C, while maintaining a state of contact with photosensitive drum 4, as far as the toner image at the point of transferring position A on photosensitive drum 4. Then, by photosensitive drum 4 and transferring drum 6 respectively rotating while maintaining a state of contact, the toner image on photosensitive drum 4 is transferred onto copy paper P on transferring drum 6. When the transferring of the first color onto copy paper P is completed in this way, control circuit 81 stops the output of pulse signals to driving circuit 72 by outputting a stop signal to timing signal generator circuit 91. By this means, the driving of stepping motor 22 by driving circuit 72 is stopped, and transferring drum 6 also stops.

Next, control circuit 81 controls a driving circuit (not shown), and by the excitation of a solenoid (not shown), photosensitive drum 4 and transferring drum 6 are separated, so that the gap between them is about 2-3 mm. Then, control circuit 81, by controlling driving circuit 72 via timing signal generator circuit 91, rotates transferring drum 6 in the reverse direction to the direction of rotation when the toner image on photosensitive drum 4 was transferred. Under the drive of stepping motor 22, transferring drum 6 rotates in reverse for only the length of the toner image. At the same time, photosensitive drum 4, after the transferring by transferring drum 6, removes the toner adhering to its surface by cleaner 17 and discharges the drum surface by erasure discharge lamp 18.

The transferring of the second color magenta toner image also is performed using the same operations by the transferring process described above.

By repeating the execution of these operations for each separate color, a full color image can be obtained by completing superimposed transferring using each of the four toners from the yellow of developer 5A to the black of developer 5D. Next, control circuit 81, by outputting a drive signal to a driver (not shown), causes movable guide plate 23 to contact transferring drum 6 by causing it to rotate from point 23a, which is separated about 2-3 cm from transferring drum 6, to point 23b. Then, the rotation of transferring drum 6 is stopped when gripper 7 is facing the paper supply position.

By this means, copy paper P, onto which a full color toner image has been transferred, is peeled from transferring drum 6 by movable guide plate 23 and is guided between hear roller 31 and pressure roller 32 of fixing unit 9 where the toner image is fixed, and then is transported by paper dispense rollers 33 and is dispensed onto receiving tray 10.

As mentioned above, the pulses outputted from the driving circuits which drive the stepping motors are outputted at time intervals in response to speed variation data stored in the memory circuits. In other words, the pulse rates of the pulses outputted from the timing signal generator circuits to the driving circuits are controlled so that the speeds of the stepping motors will not fluctuate. If excitation switching is executed based on pulses whose pulse rates are controlled, the stepping motors will rotate smoothly. When stepping motors which rotate smoothly in this way are used to rotate the photosensitive drum and the transferring drum, it is possible to reduce the randomness of pitch (jitter) in the secondary scanning direction of the outputted image, that is to say the lines which appear as bands or lines in the main scanning direction, due to the speed variations, in other words random rotation and vibration, of prior art stepping motors, and also to reduce the noise.

Also, if the excitation switching timing data of a memory circuit is set using encoded data from an encoder, there is no requirement to check the speed variations of each stepping motor beforehand, and the stepping motors will be rotated at optimum pulse rates selected by the apparatus itself, and image quality upgrading of the output images can be designed.

Moreover, test patterns for multiple excitation switching timing data sequences stored in the memory circuits are printed and the excitation switching timing data sequence which has performed the most accurate printing can be selected from the contents of those prints. Therefore, the speed variations or random rotation and vibration can be reduced, and thus image quality upgrading of the output images can be designed.

Although the above embodiment has been described for the case of application to a color printer, the present invention is not limited to color printers, and it can be applied to any system which forms images such as facsimile, monochrome printers, copiers and etc.

As described above, the speed variations, in other words the random rotation and vibration, of stepping motors can be simply and effectively reduced without the need for external added elements or the need for structural modifications, and an image forming apparatus can be provided in which high quality pictures can be provided.

What is claimed is:

1. An image forming apparatus for producing a visible image on an image forming medium, comprising:
   means for carrying a latent image;
   means for rotating the carrying means, the rotating means including a stepping motor having a plurality of excitation windings;
   means for detecting variations in the rotational speed of the rotating means;
   means for storing at least one speed variations data sequence corresponding to detected variations in the rotational speed of the rotating means;
   means for driving the rotating means; and
   means, responsive to at least one speed variation data sequence, for controlling the driving means such that the plurality of excitation windings are switched and excited at switching time intervals which compensate for variations in the rotational speed of the rotating means.

2. The apparatus of claim 1, wherein the speed variation data sequence is permanently stored in the storing means.

3. The apparatus of claim 1, wherein the speed variation data sequence is temporarily stored in the storing means.

4. The apparatus of claim 1, further comprising a test pattern signal generator for forming the latent image on the carrying means.

5. The apparatus of claim 4, wherein the test pattern signal generator generates a predetermined series of switching time intervals, and further comprising means for calculating at least one speed variation data sequence corresponding to variations between an expected constant rotational speed of the rotating means and an actual rotational speed of the rotating means upon switching of the plurality of excitation windings by the predetermined series of switching time intervals.

6. The apparatus of claim 1, further comprising means for calculating the speed variation data sequence using the output of the detecting means.

7. An image forming apparatus for producing a visible image on an image forming medium, comprising:
   means for carrying a latent image;
   means for developing the latent image to form a developed image on the carrying means;
   means for supporting an image forming medium;
   means for transferring the developed image onto the image forming medium supported by the supporting means;
   means for rotating the supporting means, the rotating means including a stepping motor having a plurality of excitation windings;
   means for detecting variations in the rotational speed of the rotating means;
   means for storing at least one speed variation data sequence corresponding to detected variations in the rotational speed of the rotating means;
   means for driving the rotating means; and
   means for controlling the driving means, responsive to at least one speed variation data sequence, such that the plurality of excitation windings are switched and excited at switching time intervals which compensate for variations in the rotational speed of the rotating means.

8. The apparatus of claim 7, wherein the speed variation data sequence is permanently stored in the storing means.

9. The apparatus of claim 7, wherein the speed variation data sequence is temporarily stored in the storing means.

10. The apparatus of claim 7, further comprising a test pattern signal generator for forming the latent image on the carrying means.

11. The apparatus of claim 7, further comprising means for calculating the speed variation data sequence using the output of the detecting means.

12. An image forming apparatus for producing a visible image on an image forming medium, comprising:
    means for carrying a latent image;
    means for developing the latent image to form a developed image on the carrying means;
    means for transferring the developed image onto an image forming medium;
    means for rotating the carrying means, the rotating means including a stepping motor having a plurality of excitation windings;
    means for driving the rotating means such that the plurality of excitation windings are switched and excited in a prescribed manner;
    means for storing a plurality of speed variation data sequences each representing a series of switching time intervals which compensate for variations in the rotational speed of the stepping motor;
    means for selecting one of the plurality of speed variation data sequence from the storing means; and
    means for controlling the driving means, responsive to the selected speed variation data sequence, such that the plurality of excitation windings are switched and excited at switching time intervals which compensate for variations in the rotational speed of the stepping motor.

13. The apparatus of claim 12, wherein the selecting means comprises a user interface operation panel.

14. The apparatus of claim 12, further comprising means for outputting a plurality of visible images on at least one image forming medium, each visible image corresponding to one of the plurality of speed variation data sequences.

15. An image forming apparatus for producing a visible image on an image forming medium, comprising:
    means for carrying a latent image;

means for developing the latent image to form a developed image on the carrying means;

means for transferring the developed image onto an image forming medium;

means for rotating the carrying means, the rotating means including a stepping motor having a plurality of excitation windings;

means for driving the rotating means such that the plurality of excitation windings are switched and excited in a prescribed manner;

an encoder for detecting the variations in the rotational speed of the rotating means driven by the driving means;

means for storing the variations detected by the encoder as a speed variation data sequence representing switching time intervals which compensate for variations in the rotational speed of the rotating means; and means for controlling driving means such that the switching time intervals are periodically varied and the excitation windings switched in correspondence to the speed variation data sequence stored in the storing means.

16. An apparatus comprising:

a drum;

means for rotating the drum, the rotating means including a stepping motor having a plurality of excitation windings;

means for detecting variations in the rotational speed of the rotating means;

means for storing at least one speed variation data sequence corresponding to detected variations in the rotational speed of the rotating means;

means for driving the rotating means; and means for controlling the driving means, responsive to at least one speed variation data sequence, such that the plurality of excitation windings are switched and excited at switching time intervals which compensate for variations in the rotational speed of the rotating means.

17. The apparatus of claim 16, wherein the speed variation data sequence is permanently stored in the storing means.

18. The apparatus of claim 16, wherein the speed variation data sequence is temporarily stored in the storing means.

19. The apparatus of claim 16, further comprising means for calculating the speed variation data sequence using the output of the detecting means.

20. An image forming apparatus for producing a visible image on an image forming medium, comprising:

means for carrying a latent image;

means for rotating the carrying means, the rotating means including a stepping motor having a plurality of excitation windings;

means for detecting a variation in the rotational speed of the rotating means;

means for driving the rotating means; and means for controlling the driving means, responsive to the variation detected by the detecting means, such that the plurality of excitation windings are switched and excited at switching time intervals which compensate for a variation in the rotational speed of the rotating means.

21. An image forming apparatus for producing a visible image on an image forming medium, comprising:

means for carrying the latent image;

means for developing the latent image to form a developed image on the carrying means;

means for supporting an image forming medium;

means for transferring the developed image onto the image forming medium supported by the supporting means;

means for rotating the supporting means, the rotating means including a stepping motor having a plurality of excitation windings;

means for detecting a variation in the rotational speed of the rotating means;

means for driving the rotating means; and means for controlling the driving means, responsive to the variation detected by the detecting means, such that the plurality of excitation windings are switched and excited at switching time intervals which compensate for a variation in the rotational speed of the rotating means.

* * * * *

UNITED STATES PATENT AND TRADEMARK OFFICE
CERTIFICATE OF CORRECTION

PATENT NO. : 5,111,242
DATED : May 5, 1992
INVENTOR(S) : Koji Tanimoto, et. al.

It is certified that error appears in the above-indentified patent and that said Letters Patent is hereby corrected as shown below:

On the Title page, item [57], Abstract, col. 2, line 10, change "photosenstive" to --photosensitive--.

Column 13, Claim 1, line 35, change "variations" to --variation--.

Signed and Sealed this

Twenty-first Day of December, 1993

Attest:

BRUCE LEHMAN

*Attesting Officer*      *Commissioner of Patents and Trademarks*